(12) United States Patent
Yang et al.

(10) Patent No.: US 12,024,413 B2
(45) Date of Patent: Jul. 2, 2024

(54) SCREW CAPPING DEVICES FOR A TEST TUBE

(71) Applicant: BEIJING HUIRONGHE TECHNOLOGY CO., LTD., Beijing (CN)

(72) Inventors: Fucheng Yang, Beijing (CN); Chaowen Li, Beijing (CN)

(73) Assignee: BEIJING HUIRONGHE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/525,769

(22) Filed: Nov. 30, 2023

(65) Prior Publication Data

US 2024/0092622 A1 Mar. 21, 2024

Related U.S. Application Data

(63) Continuation of application No. PCT/CN2021/130089, filed on Nov. 11, 2021.

(30) Foreign Application Priority Data

Jun. 3, 2021 (CN) .......................... 202110620277.4

(51) Int. Cl.
*B67B 3/20* (2006.01)

(52) U.S. Cl.
CPC ............ *B67B 3/202* (2013.01); *B67B 3/2066* (2013.01)

(58) Field of Classification Search
CPC ......... B67B 3/202; B67B 3/2066; B67B 3/00; B67B 3/02; B67B 3/10; B67B 3/012;
(Continued)

(56) References Cited

U.S. PATENT DOCUMENTS 6,257,091 B1 7/2001 Cohen et al.
2019/0160666 A1* 5/2019 Pollack .................. B25J 9/1697

FOREIGN PATENT DOCUMENTS

| CH | 687759 A5 | 2/1997 |
| CN | 106495073 A | 3/2017 |

(Continued)

OTHER PUBLICATIONS

First Office Action in Chinese Application No. 202110620277.4 mailed on Jun. 24, 2022, 14 pages.
(Continued)

*Primary Examiner* — Veronica Martin
(74) *Attorney, Agent, or Firm* — Porus IP LLC

(57) ABSTRACT

A screw capping device for a test tube is provided. The device comprises a grasping unit configured to grasp a test tube cap and a rotating unit. The rotating unit includes a clamping assembly and a rotating assembly. The clamping assembly includes a test tube chamber used to accommodate a test tube body. A test tube pad with an inclined plane is disposed at the bottom of the test tube body. The rotating assembly includes a rotating shaft configured to drive the test tube chamber to rotate. The clamping assembly further includes a cage and cylindrical rollers. Gradient cavities are formed between the cage and the test tube chamber. The cylindrical rollers are located in the gradient cavities. The cylindrical rollers abut against and are pressed against the test tube body from a state where there is a gap between the test tube body and the cylindrical rollers.

5 Claims, 6 Drawing Sheets

(58) Field of Classification Search
CPC .... B67B 3/14; B67B 3/16; B67B 3/18; B67B 3/20; B67B 3/2006; B67B 3/2013; B67B 3/28; B65B 7/00
See application file for complete search history.

(56) References Cited

FOREIGN PATENT DOCUMENTS

| | | |
|---|---|---|
| CN | 206901732 U | 1/2018 |
| CN | 207226971 U | 4/2018 |
| CN | 108268809 A | 7/2018 |
| CN | 110510560 A | 11/2019 |
| CN | 209583574 U | 11/2019 |
| CN | 210457406 U | 5/2020 |
| CN | 210620194 U | 5/2020 |
| CN | 111891999 A | 11/2020 |
| CN | 212050462 U | 12/2020 |
| CN | 112198324 A | 1/2021 |
| CN | 212976226 A | 4/2021 |
| CN | 114436183 B | 6/2022 |
| DE | 4022939 A1 | 1/1992 |
| JP | 2005239258 A | 9/2005 |
| JP | 2006335385 A | 12/2006 |

OTHER PUBLICATIONS

Decision to Grant a Patent in Chinese Application No. 202110620277.4 mailed on Oct. 21, 2022, 3 pages.
International Search Report in PCT/CN2021/130089 mailed on Jan. 28, 2022, 8 pages.
Written Opinion in PCT/CN2021/130089 mailed on Jan. 28, 2022, 8 pages.

* cited by examiner

SCREW CAPPING DEVICES FOR A TEST TUBE

CROSS-REFERENCE TO RELATED APPLICATION

This application is a continuation of International Application No. PCT/CN2021/130089, filed on Nov. 11, 2021, which claims priority to Chinese Patent Application No. 202110620277.4, filed on Jun. 3, 2021, the entire contents of each of which are hereby incorporated by reference.

TECHNICAL FIELD

The present disclosure relates to the field of a medical testing device or the field of a biological laboratory device, and in particular, to screw capping devices for a test tube.

BACKGROUND

Test tubes are common vessels used in the fields of biology and chemistry, and are widely used in hospitals, testing organizations, etc. Currently in the medical field, such as in specimen testing, during the use of a test tube, it is necessary to open the test tube cap several times to add a substance to the test tube or to perform sample mixing and screw the corresponding test tube cap back on after the operation is completed for use.

At present, it is generally operated manually, but in the manual method, each test tube cap needs to be unscrewed and tightly screwed in a one-to-one correspondence. A new sterile glove needs to be replaced with for each operation, which is inefficient and prone to sample contamination. At the same time, after the test tube cap is removed, and the substance is added or the sample mixing is performed, the test tube cap is usually screwed back on manually, which does not guarantee the one-to-one correspondence between the test tube and test tube cap.

To address the above issues, relevant personnel have developed technologies to automatically open and close the test tube cap, which improves work efficiency without manual operation. However, in the prior art, all the test tube cap opening and closing devices consist of two parts. A clamping device is used to clamp the test tube body and the test tube cap, and a rotating mechanism is used to rotate the test tube cap or the test tube body to complete the action of opening and closing the test tube cap. The overall structure is relatively complex. Therefore, it is desirable to provide a simple, compact, and low-cost screw capping device for a test tube when some experimental equipment with more control programs and complex control elements carry out the experimental process.

SUMMARY

One or more embodiments of the present disclosure provide a screw capping device for a test tube. In the screw capping device for a test tube, only a test tube cap needs to be clamped and a test tube body is rotated using a rotating mechanism. Compared with that the test tube body and the test tube cap need to be clamped, respectively, and a rotating body is needed in the structure in the prior art, the screw capping device for a test tube in the present disclosure has a simple and compact structure, low costs, and is flexible and easy to use.

The screw capping device for a test tube comprises a grasping unit configured to grasp a test tube cap and a rotating unit directly facing the grasping unit. The rotating unit includes: a clamping assembly, including a test tube chamber used to accommodate the test tube body, a test tube pad being disposed at a bottom of the test tube chamber, and the test tube pad being provided with an inclined plane towards one side of the test tube body; and a rotating assembly, including a rotating shaft, the rotating shaft being configured to drive the test tube chamber to rotate.

In some embodiments, the clamping assembly further includes a cage, the cage is provided with a plurality of cylindrical rollers, the test tube body is coaxial with the test tube chamber when there is a gap between the test tube body and the test tube pad, and at this time, there is a gap between the test tube body and the cylindrical rollers. A plurality of gradient cavities are formed between the cage and the test tube chamber, the cylindrical rollers are located in the gradient cavities in a one-to-one correspondence, and the cylindrical rollers abut against and are pressed against the test tube body from a state where there is a gap between the test tube body and the cylindrical rollers when moving in the gradient cavities. The cage is connected to the rotating shaft, and the rotating shaft is capable of driving the cage to rotate.

In some embodiments, each of the gradient cavities is a curved cavity.

In some embodiments, the cylindrical rollers and the gradient cavities are evenly arranged around an axis of the cage.

In some embodiments, the test tube chamber is mounted with one or more magnets, and the one or more magnets are mounted at a plurality of central positions of the plurality of gradient cavities and are configured to generate magnetic forces to attract the cylindrical rollers.

In some embodiments, when there are a plurality of magnets, the plurality of the magnets, the plurality of the gradient cavities, and the plurality of the cylindrical rollers are mounted in a one-to-one correspondence.

In some embodiments, the rotating assembly further includes a base, the base is mounted with a bearing, the test tube chamber is mounted on the base and abuts against the bearing, and the test tube chamber is rotatable around an axis of the test tube chamber relative to the base.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
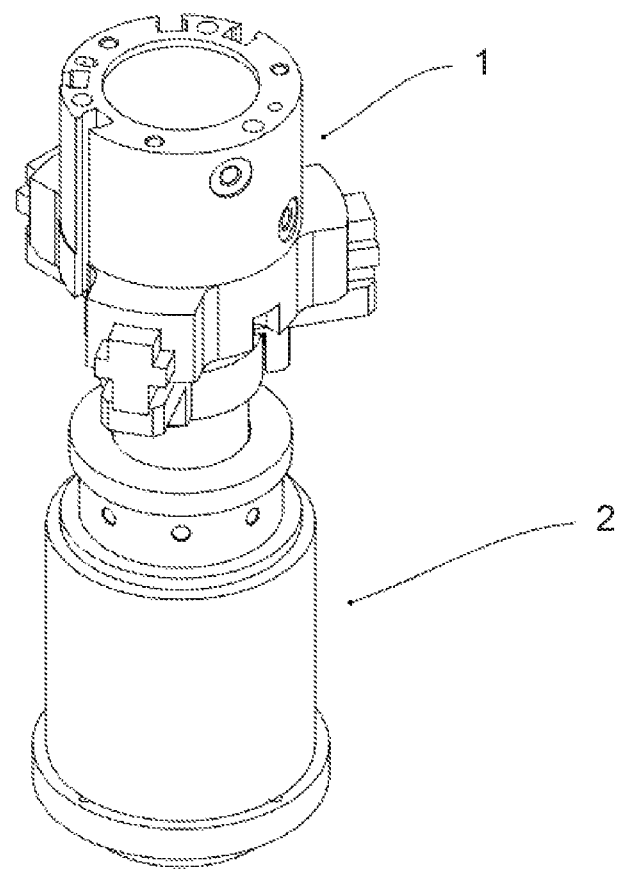
FIG. 1 is a schematic diagram of a structure of a screw capping device for a test tube according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing.

Figure 2:
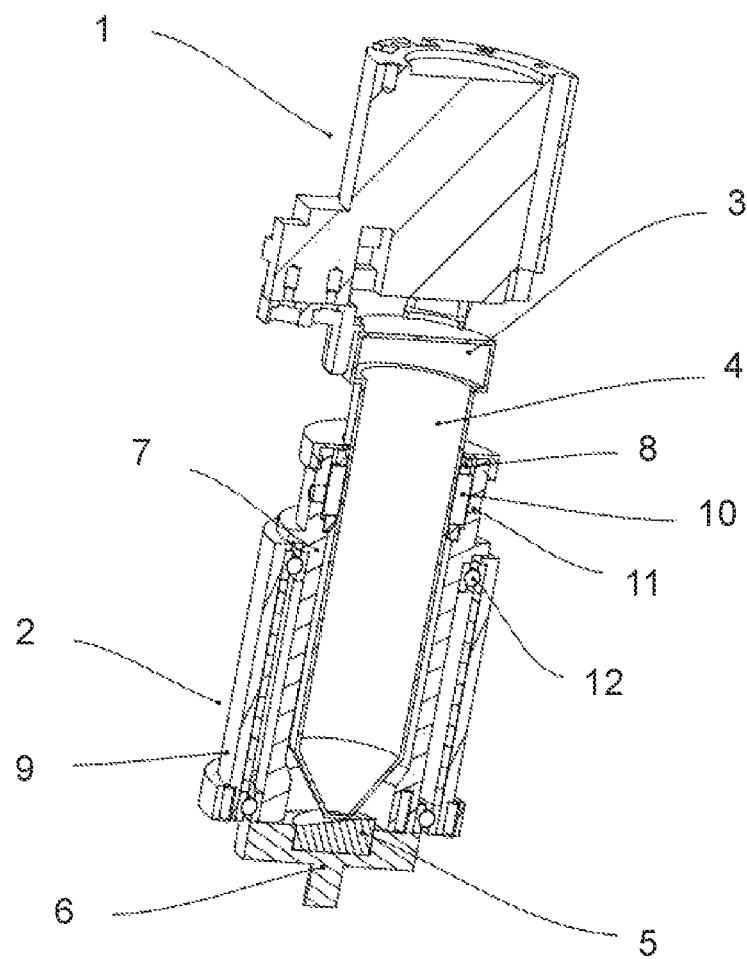
FIG. 2 is a cross-sectional view of a screw capping device for a test tube according to some embodiments of the present disclosure.

FIG. 1 is a schematic diagram of a structure of a screw capping device for a test tube according to some embodiments of the present disclosure. FIG. 2 is a cross-sectional view of a screw capping device for a test tube according to some embodiments of the present disclosure.

In some embodiments of the present disclosure, the screw capping device for a test tube is provided. As shown in FIGS. 1 and 2, the screw capping device for a test tube comprises a grasping unit 1 and a rotating unit 2. The grasping unit 1 is configured to grasp a test tube cap 3, and the rotating unit 2 is configured to rotate a test tube body 4.

The test tube body 4 refers to a tubular structure with an accommodation cavity. The accommodation cavity may be used to accommodate other substances. The accommodation cavity includes at least one opening. The test tube cap 3 is capable of opening or closing an opening of the test tube body 4. In some embodiments, the test tube cap 3 may be connected to the test tube body 4 through rotation. In some embodiments, the test tube cap 3 may be elastic. For example, the test tube cap 3 is made of rubber. When the test tube cap 3 and the test tube body 4 are in contact, the test tube cap 3 does not rotate, and the test tube body 4 rotates relatively, an action of screw capping of a test tube may be completed. In some embodiments, the grasping unit 1 of the screw capping device for a test tube may include, but is not limited to, being gripped using a commercially available mechanical hand.

In some embodiments, as shown in FIG. 2, the rotating unit 2 directly faces the grasping unit 1, and the screw capping device for a test tube further includes a clamping assembly and a rotating assembly. The clamping assembly refers to a structure capable of providing a clamping force to the test tube body 4. The clamping assembly may apply pressure to the test tube body 4 from at least two directions, so that the test tube body 4 remains fixed relative to the clamping assembly under the action of the pressure. The rotating assembly refers to a structure capable of outputting torque, and the torque output by the rotating assembly may drive other structures to rotate synchronously. The clamping assembly and the rotating assembly cooperate to clamp and drive the test tube body 4 to rotate, so as to ensure that the test tube cap 3 is directly covered on the test tube body 4. In some embodiments, the clamping assembly includes a test tube chamber 7. The test tube body 4 is placed in the test tube chamber 7. The test tube chamber 7 refers to a structure including at least one accommodation space. The accommodation space may be used to place the test tube body 4. In some embodiments, the accommodation space of the test tube chamber 7 may have a shape that matches a shape of the test tube body 4. For example, when the test tube body 4 is cylindrical, the test tube chamber 7 is also cylindrical. The test tube body 4 and the test tube chamber 7 may also be of other shapes, such as prismatic. A diameter of the accommodation space may be greater than or equal to a diameter of the test tube body 4.

In some embodiments, a cage 8 is also disposed in the test tube chamber 7. The cage 8 is coaxial with the test tube chamber 7. The cage 8 is provided with a plurality of cylindrical rollers 10. The cage 8 is sleeved outside the test tube body 4. There is a gap between the test tube body 4 and the cage 8. The cylindrical rollers 10 refer to cylindrical structures disposed between two surfaces that may form rolling connections with the two surfaces, respectively. The cage 8 is used to keep relative positions of the plurality of cylindrical rollers 10 stable. In some embodiments, the plurality of cylindrical rollers 10 may be evenly distributed in an annular shape around an axis of the test tube chamber 7. In some embodiments, the cage 8 may be an annular structure. In some embodiments, when the test tube body 4 is located in the test tube chamber 7 and coaxial with the test tube chamber 7 and the cage 8, there is a gap between the test tube body 4 and the cylindrical rollers 10.

In some embodiments, a test tube pad 5 is disposed at a bottom of the test tube chamber 7. The test tube pad 5 may be used to support the test tube body 4. In some embodiments, the test tube pad 5 may be an elastic structure. For example, the test tube pad 5 may be made of rubber or silicone. The test tube pad 5 is located directly below the test tube body 4. The test tube pad 5 is disposed towards one side of the test tube body 4. That is, an upper surface of the test tube body 4 is an inclined plane, and there is an angle between the upper surface of the test tube body 4 and a horizontal plane. When the test tube body 4 is not screwed on the test tube cap 3, i.e., when the test tube body 4 is coaxial with the test tube chamber 7 and the cage 8, there is a gap between the test tube body 4 and the test tube pad 5. In the process of screw capping of the test tube body 4, the test tube body 4 gradually contacts and gradually presses down the test tube pad 5.

In the screw capping device for a test tube provided in some embodiments of the present disclosure, only the test tube cap is needed to be grasped and pressed the test tube body by the grasping unit, and the test tube body moves downward to abut against the test tube pad and moves along the inclined plane of the test tube pad until the test tube body is tilted. The tilted test tube body abuts against the cylindrical rollers, and the rotating assembly drives the test tube body and the cage to rotate. At this time, the cylindrical rollers are driven by a friction force against the test tube body to move in the gradient cavities. The more the cylindrical rollers move towards an edge, the greater the pressure between the cylindrical rollers and the test tube body, thereby clamping the test tube body. At this time, the test tube cap does not move, and the test tube body rotates to achieve the action of the screw capping. The entire process may be achieved using one grasping unit and one rotating mechanism to rotate the test tube body. Compared with that the test tube body and the test tube cap need to be clamped respectively and the rotating body is needed in the structure in the prior art, the screw capping device for a test tube in the present disclosure has a simple and compact structure, low costs, and is flexible and easy to use.

Figure 3:
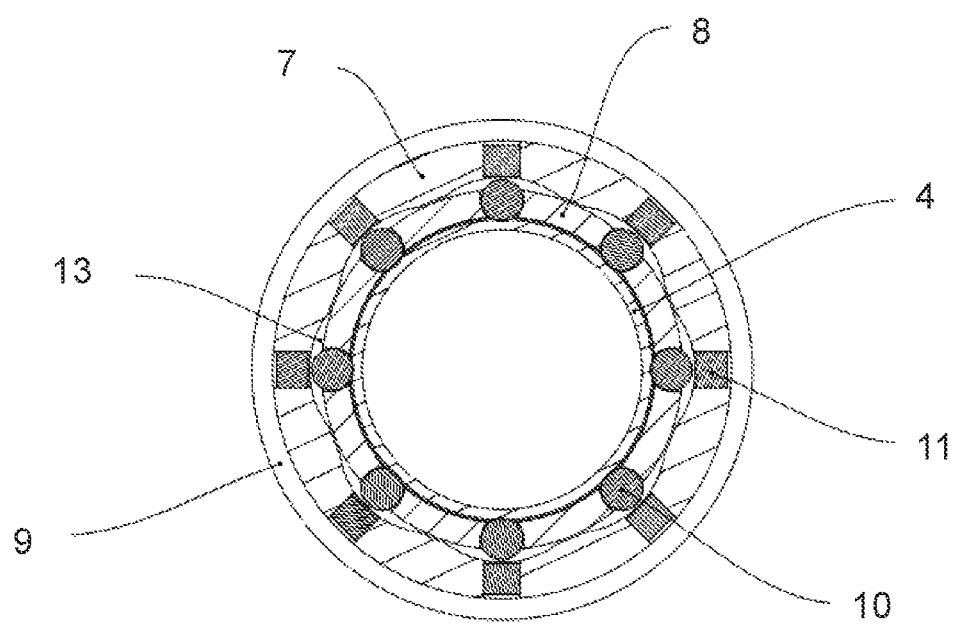
FIG. 3 is a cross-sectional view of a clamping assembly of a screw capping device for a test tube according to some embodiments of the present disclosure.

FIG. 3 is a cross-sectional view of a clamping assembly of a screw capping device for a test tube according to some embodiments of the present disclosure. In some embodiments, a plurality of gradient cavities 13 are formed between the test tube chamber 7 and the cage 8, as shown in FIG. 3. The gradient cavities 13 refer to cavity structures of which sizes change gradually. In some embodiments, the cylindrical rollers 10 are located in the gradient cavities 13. One gradient cavity 13 corresponds to one cylindrical roller 10. The cylindrical rollers 10 may move in the gradient cavities 13. When the cylindrical rollers 10 move in the gradient cavities 13, due to the spatial change in the gradient cavities 13, the cylindrical rollers 10 abut against and are pressed against the test tube body 4 from a state where there is a gap between the test tube body and the cylindrical rollers. For example, at least one of the gradient cavities 13 is configured as a curved cavity. In a cross-sectional view perpendicular to the axis of the test tube chamber 7, a side of at least one of the gradient cavities 13 close to the test tube chamber 7 may be curved. When the test tube body 4, the test tube chamber 7, and the cage 8 are all coaxial, there is a gap between the test tube body 4 and the cylindrical rollers 10. At this time, for each of the cylindrical rollers 10 and each of the gradient cavities 13 corresponding to the cylindrical roller 10, the cylindrical roller 10 is located at a maximum space of the gradient cavity 13, that is, the cylindrical roller 10 is located at a central position of the gradient cavity 13. When the test tube body 4 abuts against the cylindrical rollers 10, the cylindrical rollers 10 are driven to move to a small space in the gradient cavities 13 by a friction force against the test tube body 4. In some embodiments, the plurality of cylindrical rollers 10 and the plurality of gradient cavities 13 are evenly arranged around an axis of the cage 8.

In some embodiments, the rotating assembly includes a rotating shaft 6. The rotating shaft 6 is connected to the test tube chamber 7 and the cage 8 and is used to drive the test tube chamber 7 and the cage 8 to rotate.

When the test tube body 4 needs to be screw capped, the grasping unit 1 grabs the test tube cap 3, covers the test tube cap 3 on the test tube body 4, and presses the test tube body 4. The test tube body 4 is pressed down against the test tube pad 5 and the test tube body 4 becomes inclined along the inclined plane of the test tube pad 5. The inclined test tube body 4 begins to abut against the cylindrical roller 10. The larger the inclined angle of the test tube body 4, the larger the counter-pressure between the test tube body 4 and the cylindrical rollers 10, and the larger the friction force between the test tube body 4 and the cylindrical rollers 10.

In some embodiments, the grasping unit 1 grasps the test tube cap 3, covers the test tube cap 3 on the test tube body 4, and presses down the test tube body 4. The test tube body 4 abuts against the test tube pad 5 and becomes inclined, and abuts against the cylindrical rollers 10. The rotating shaft 6 drives the test tube chamber 7 and the cage 8 to rotate. The test tube body 4 and the cage 8 tend to rotate relatively. However, since the test tube body 4 abuts against and is pressed against the cylindrical rollers 10, there is a friction force between the cylindrical rollers 10 and the test tube body 4. Therefore, a rotation speed of the cage 8 is kept smaller than that of the test tube chamber 7. At this time, the cylindrical rollers 10 move to one side from the central positions of the gradient cavities 13. Since the space on one side of the gradient cavities 13 gradually becomes smaller, the cylindrical rollers 10 gradually protrude to one side of the test tube body 4, respectively. The counter-pressure between the test tube body 4 and the cylindrical rollers 10 gradually increases until the plurality of cylindrical rollers 10 clamp the test tube body 4. At this time, the test tube body 4 rotates along with the test tube chamber 7, and the test tube cap 3 does not move, thereby completing the action of screw capping of the test tube cap 3. In some embodiments, when the test tube cap 3 needs to be unscrewed from the test tube body 4, the same working principle is used. The grasping unit 1 grasps the test tube cap 3, and the clamping assembly and the rotating assembly cooperate to press and rotate the test tube body 4 to complete an action of disengaging the test tube cap 3 from the test tube body 4.

In some embodiments, as shown in FIG. 3, the test tube chamber 7 is also mounted with one or more magnets 11. The one or more magnets 11 are mounted at the central positions of the gradient cavities 13. When the test tube cap 3 is tightened on the test tube body 4 or the test tube cap 3 is disengaged from the test tube body 4, the rotating assembly stops. At this time, the cylindrical rollers 10 return to the central positions of the gradient cavities 13 under an attraction force of the magnets 11. The cylindrical rollers 10 loosen the test tube body 4. The test tube body 4 may be taken out and a new test tube body 4 may be placed to complete a next action.

In some embodiments, there may be a plurality of magnets 11. The plurality of magnets 11, the plurality of the gradient cavities, and the plurality of the cylindrical rollers are mounted in a one-to-one correspondence. That is, the central position of each gradient chamber 13 is mounted with one magnet 11.

Since there are a plurality of magnets, when the test tube body and the test tube cap are separated, the cylindrical rollers located at edge positions of the gradient cavities may gradually move towards the central positions of the gradient cavities under the attraction force of the magnets. Since there is a large space in the central positions of the gradient cavities, when the cylindrical rollers move from the edge positions to the central positions, the counter-pressure between the cylindrical rollers and the test tube body decreases gradually until the test tube body is automatically loosened, and the action of separating the test tube cap from the test tube body. The structure is simple, easy to operate, and highly automated.

In some embodiments, to ensure a pleasing appearance and facilitate mounting and use, the rotating assembly is further provided with a base 9. The base 9 is mounted with a bearing 12. The test tube chamber 7 is mounted on the base 9 and abuts against the bearing 12. The test tube chamber 7 is rotatable around the axis of the test tube chamber 7 relative to the base 9. The entire structure of the screw capping device for a test tube is simple and compact, low-cost, and flexible and convenient to use. There is no need to add a rotating mechanism for rotating the test tube cap.

For the screw capping device for a test tube provided in some embodiments of the present disclosure, the whole structure does not need to be provided with a clamping device to clamp the test tube body separately is not required and a rotating mechanism for the test tube cap, which structure is compact and low-cost.

In some embodiments, an elastic member is disposed between the cylindrical roller 10 and the test tube body 4.

The elastic member may be elastically deformed under the action of an external force, which may play the role of cushioning and vibration reduction. In some embodiments, the elastic member is elastically deformed by extrusion of the cylindrical roller 10, which may increase a contact area between the elastic member and the test tube body 4. A line contact between the cylindrical roller 10 and the test tube body 4 is replaced by a surface contact between the elastic member and the test tube body 4. The elastic member may disperse the local counter-pressure of the cylindrical roller 10 on the test tube body 4, which reduces the pressure per unit area of the test tube body 4 and prevents the test tube body 4 from being damaged by direct extrusion of the cylindrical roller 10. In some embodiments, when the cylindrical roller 10 is a rigid structure (e.g., made of a metal material), a rigid contact between the cylindrical roller 10 and the test tube body 4 may be replaced with a flexible contact between the elastic member and the test tube body 4 by disposing the elastic member, which prevents the cylindrical roller 10 from crushing the test tube body 4.

Figure 4:
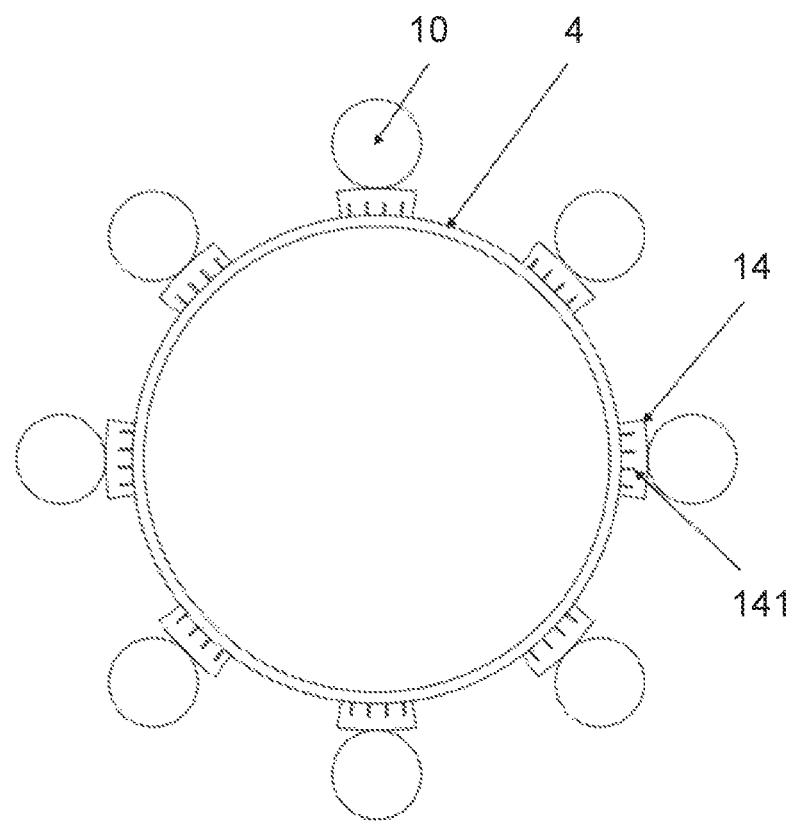
FIG. 4 is a schematic diagram of a structure of an elastic member according to some embodiments of the present disclosure.
Figure 5:
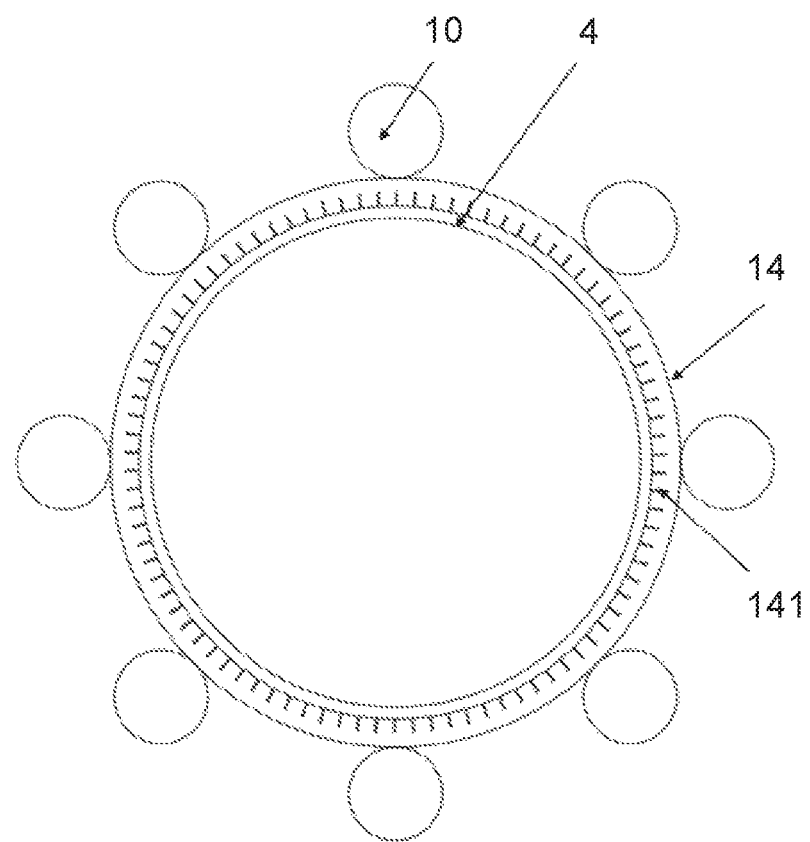
FIG. 5 is a schematic diagram of another structure of an elastic member according to some embodiments of the present disclosure.

FIG. 4 is a schematic diagram of a structure of an elastic member according to some embodiments of the present disclosure. FIG. 5 is a schematic diagram of another structure of an elastic member according to some embodiments of the present disclosure.

In some embodiments, a material of the elastic member 14 may be a material with a relatively large coefficient of friction. For example, the material includes at least one of silicone, nitrile rubber, etc.

In some embodiments, there may be one or more elastic members 14. In some embodiments, as shown in FIG. 4, when there are a plurality of elastic members 14, they may be of elongated structures. The elastic members 14 are disposed between the cylindrical rollers 10 and the test tube body 4 in directions parallel to the axes of the elastic members 14. In some embodiments, a count of elastic members 14 is the same as a count of cylindrical rollers 10. The elastic members 14 may be arranged corresponding to the gradient cavities 13. In some embodiments, there may be 2 or 3 elastic members 14, they may be spaced apart from each other, and a spacing decreases when they are extruded by the cylindrical rollers 10 (the spacing may decrease to 0, i.e., two adjacent elastic members 14 are in contact), so that the elastic members 14 may fit against an outer side surface of the test tube body 4. In some embodiments, as shown in FIG. 15, when there is one elastic member 14, it may be of a cylindrical structure, and an inner side surface of the elastic member 14 may fit against the outer side surface of the test tube body 4.

In some embodiments, one side of the elastic member 14 close to the test tube body 4 is a cylindrical surface or a portion of the cylindrical surface that fits the test tube body 4. In some embodiments, as shown in FIG. 4 and FIG. 5, there are a plurality of elongated grooves 141 on the side of the elastic member 14 close to the test tube body 4. The elongated grooves 141 may be disposed in various ways. For example, the elongated grooves 141 may be parallel to an axis of the test tube body 4, disposed along a circumferential direction of the test tube body 4, disposed inclinedly with respect to the axis of the test tube body 4, etc.

By disposing the elongated grooves, a roughness degree of the side of the elastic member adjacent to the test tube body may be increased, thereby increasing the friction force between the elastic member and the test tube body and preventing slipping. Additionally, the elongated grooves may provide reserved space for the elastic deformation of the elastic member.

In some embodiments, the elastic member 14 may be detachably connected to the cage 8. There are a plurality of detachable connections, for example, the elastic member 14 and the cage 8 may be connected through at least one of a snap connection, slot connection, pin connection, screw connection, etc.

The elastic member 14 is detachably connected to the cage 8, so that the elastic members with different thicknesses may be replaced according to f the test tube body 4 with different diameters, which ensures that the cylindrical roller 10, the elastic member 14, and the test tube body 4 are always in contact, avoids a gap between the cylindrical roller 10 and the elastic member 14 or between the elastic member 14 and the test tube body 4, and prevents the cylindrical roller 10 from clamping the test tube body 4.

In some embodiments, a distance by which the grasping unit 1 controls to press down the test tube body 4 may be related to the diameter of the test tube body 4. With a size of the test tube chamber 7 remains unchanged, the smaller the diameter of the test tube body 4, the larger the gap between the test tube body 4 and the test tube chamber 7, and the greater the angle at which the test tube body 4 needs to be inclined in order to come into contact with the cylindrical roller 10. The angle at which the test tube body 4 is inclined may be controlled by controlling the distance by which the grasping unit 1 controls to press down the test tube body 4, thereby increasing a range of application of a test tube tightening device.

In some embodiments, the test tube chamber 7 may be a length-adjustable structure, for example, the test tube chamber 7 may be a retractable structure. By adjusting the length of the test tube chamber 7, the test tube body 4 with different lengths may be applied, thereby increasing the range of application of the test tube tightening device.

Figure 6:
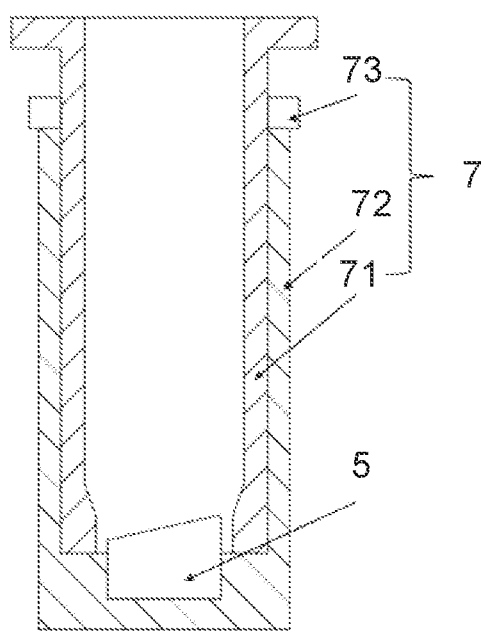
FIG. 6 is a schematic diagram of a structure of a test tube chamber according to some embodiments of the present disclosure.

FIG. 6 is a schematic diagram of a structure of a test tube chamber according to some embodiments of the present disclosure. As shown in FIG. 6, the test tube chamber 7 may include a first chamber body 71 and a second chamber body 72, wherein the second chamber body 72 is sleeved outside the first chamber body 71. The first chamber body 71 and the second chamber body 72 may move relative to each other along an axial direction of the first chamber body 71. In some embodiments, an outer side surface of the first chamber body 71 is provided with external threads, and an inner side surface of the second chamber body 72 is provided with internal threads that are compatible with the external threads of the first chamber body 71, so that the first chamber body 71 and the second chamber body 72 may be connected by through the threads. An overall length of the test tube chamber 7 may be increased by relative rotation of the first chamber body 71 and the second chamber body 72. When the first chamber body 71 rotates one circle relative to the second chamber body 72, the test tube chamber 7 may be increased in length by one pitch, which can improve the adjustment accuracy when adjusting the length of the test tube chamber 7. In some embodiments, the test tube chamber 7 may further include locking nuts 73. The locking nuts 73 are connected to the external threads of the first chamber body 71. When the length of the test tube chamber 7 is adjusted in place, the locking nuts 73 may be rotated until they abut against the second chamber body 72, thereby locking the second chamber body 72 and preventing any further change in the relative position of the first chamber body 71 and the second chamber body 72.

In some embodiments, by adjusting a relative distance between the grasping unit 1 and the test tube chamber 7, the test tube body 4 with different lengths may also be applied within a certain range.

In some embodiments, the screw capping device for a test tube further includes a processor and a driving device, wherein the driving device is in transmission connection with the rotating shaft 6. The processor is communicatively connected to the driving device.

The driving device may provide power to drive other structures to perform corresponding actions. In some embodiments, the driving device may output torque to drive the rotating shaft 6 to rotate. In some embodiments, the driving device may include a motor, a transmission structure, etc. The transmission structure may be connected between the motor and the rotating shaft 6 to transmit the torque output by the motor to the rotating shaft 6.

The processor is capable of collecting, analyzing, processing information and/or data, generating a control instruction based on the information and/or data, and sending the control instruction to an actuator (e.g., a driving device or a function module) to cause the actuator to perform corresponding actions or functions.

In some embodiments, the processor may determine a cap opening and closing state based on a change in a magnitude of a current of the driving device.

The cap opening and closing state refers to a condition in which the test tube cap 3 is connected to the test tube body 4. In some embodiments, the cap opening and closing state may include a cap opening state, a cap closing state, etc. When the test tube cap 3 and the test tube body 4 are in the cap opening state, the test tube cap 3 and the test tube body 4 are separated from each other or the test tube cap 3 and the test tube body 4 are not tightly connected. When the test tube cap 3 and the test tube body 4 are in the cap closing state, the test tube cap 3 and the test tube body 4 are tightly connected.

In some embodiments, the change in the magnitude of the current of the driving device may be obtained by a sensor (e.g., a current sensor). The sensor is communicatively connected to the processor. The sensor may transmit the change in the magnitude of the collected current to the processor. In some embodiments, the magnitude of the current of the driving device may be related to the torque output by the driving device. For example, the magnitude of the current may be positively correlated with the torque.

In some embodiments, the torque output by the driving device decreases from the cap closing state to the cap opening state. Accordingly, the magnitude of the current gradually decreases. In some embodiments, when the current decreases to a preset cap opening current value, the processor may determine that the cap is successfully opened. At this time, the test tube cap 3 and the test tube body 4 are in the cap opening state. In some embodiments, when the current increases to a preset cap closing current value, the processor may determine that the cap is successfully closed. At this time, the test tube cap 3 and the test tube body 4 are in the cap closing state. In some embodiments, the preset cap opening current value and the preset cap closing current value are preset thresholds. The processor may preset the thresholds based on experience, table looking up, or historical data.

In some embodiments, when the test tube cap 3 and the test tube body 4 are tightly screwed (i.e., a degree in which the test tube cap 3 and the test tube body 4 are screwed is greater than a degree in which the test tube cap 3 and the test tube body 4 are just screwed), the driving device needs to overcome a large resistance to drive the test tube body 4 to rotate to make the test tube cap 3 and the test tube body 4 rotate from a state in which the test tube cap 3 and the test tube body 4 are tightly screwed to an extent in which they are just screwed. At this time, the current of the driving device may gradually increase. When the driving device rotates from the degree in which the test tube cap 3 and the test tube body 4 are just screwed to a state where they are in the cap opening cap, the current of the driving device gradually decreases due to the decrease in the resistance of rotation of the test tube body 4. The processor may determine whether the cap is successfully opened based on the change of gradual increase and gradual decrease in current. In some embodiments, when a state in which the test tube cap 3 and the test tube body 4 are in changes from the cap opening state to the cap closing state, the resistance of the rotation of the test tube body 4 gradually increases, and the current of the driving device gradually increases. The processor may determine whether the cap is successfully closed based on the gradual increase in current.

The processor is disposed, the driving device is controlled using the processor, and the cap opening and closing state is determined using the processor, which improves the degree of automation, so that the driving device may automatically stop when the current reaches the preset cap opening current value or the preset cap closing current value.

In some embodiments, the processor may determine a current trend and threshold of successful cap opening/closing based on changes in the currents of the test tube body 4 of different diameters in the screw capping through a test tube cap opening and closing determination model.

The current trend of successful cap opening/closing refers to a change in the current of the driving device in a process from the beginning of cap opening to successful cap closing or from the cap closing to the successful cap opening.

The threshold refers to a magnitude of current of the driving device at the time of successful cap opening/closing.

In some embodiments, the test tube cap opening and closing determination model is a model that may determine the current trend and threshold of successful cap opening/closing. The test tube cap opening and closing determination model may be a machine learning model. For example, the test tube cap opening and closing determination model may be Neural Networks (NN), Convolutional Neural Networks (CNN), etc.

In some embodiments, an input of the test tube cap opening and closing determination model may be a test tube diameter. In some embodiments, an output of the test tube cap opening and closing determination model may be the current trend and threshold of successful cap opening/closing. The test tube diameter refers to an outer diameter of the test tube body 4. In some embodiments, the processor may obtain the test tube diameter through a diameter measuring structure. More descriptions regarding the diameter measuring structure may be found below.

In some embodiments, the test tube cap opening and closing determination model may be obtained by training a plurality of first training samples with first labels. The plurality of first training samples with the first labels may be input into an initial test tube cap opening and closing determination model. A loss function may be constructed based on the first labels and results of the initial test tube cap opening and closing determination model. Parameters of the initial test tube cap opening and closing determination model may be iteratively updated based on the loss function.

When the loss function of the initial test tube cap opening and closing determination model meets a preset condition, the model training is completed and a trained test tube cap opening and closing determination model is obtained. The preset condition may include that the loss function converges, a count of iterations reaches a threshold, etc.

In some embodiments, the first training samples may at least include corresponding test tube diameters in historical test tube cap opening/closing processes. In historical successful cap opening/closing processes, current trends in corresponding preset time periods and current values at the time of successful cap opening/closing may be used as the training labels. In some embodiments, the training process of the test tube cap opening and closing determination model may be implemented on a remote server communicatively connected to the processor, and the output of the model may be obtained from the remote server.

In some embodiments of the present disclosure, the current trend and threshold of successful cap opening/closing may be predicted using the test tube cap opening and closing determination model, which may improve the accuracy of the predicted current trend and threshold.

In some embodiments, the screw capping device for a test tube may also include a power module. The magnet 11 may be an electromagnet. The power module is electrically connected to the electromagnet. The electromagnet includes an iron core and a coil. The coil wraps around the outside of the iron core in a spiral shape. When the coil is energized, the iron core may generate a magnetic force. When the coil is de-energized, the magnetic forces of the iron core may disappear.

In some embodiments, the power module may be electrically connected to the coil, and the power module may energize or de-energize the coil.

In some embodiments, the power module may be communicatively connected to the processor. The processor may send a control instruction to make the power module energize or de-energize the coil. In some embodiments, after determining that the cap is successfully opened, the processor may control the power module to energize the coil, so that the electromagnet has magnetism and the electromagnet may attract the cylindrical rollers 10 to make the cylindrical rollers 10 return to the central positions of the gradient cavities 13.

In some embodiments, the processor may control the magnitude of current energized by the power module to the coil, thereby controlling a magnitude of the magnetic force of the electromagnet. The magnitude of the current is positively correlated with the magnitude of the magnetic force. In some embodiments, during the rotation of the rotating assembly, it is necessary for the cylindrical rollers 10 to clamp the test tube body 4, so as to prevent the clamping force of the cylindrical rollers 10 on the test tube body 4 from weakening. The processor may control the power module to de-energize the coil, so that the magnetic force of the electromagnet disappears, thereby preventing the cylindrical rollers 10 from being attracted by the magnetic force and reducing the clamping force on the test tube body 4.

In some embodiments, the magnitude of current in the coil of the electromagnet may be related to the diameter of the test tube body 4. In some embodiments, the magnitude of the current in the coil may be negatively correlated with the diameter of the test tube body 4. When the size of the test tube chamber 7 remains unchanged, the larger the diameter of the test tube body 4, the smaller the gap between the test tube body 4 and the test tube chamber 7, and the closer the cylindrical rollers 10 are to the cage 8 in the gradient cavities 13. Therefore, the magnet 11 may attract the cylindrical roller 10 without great magnetism at this time.

By using the electromagnet, the magnetism of the magnet may be avoided from weakening or disappearing due to long-term use, and a deterioration of the magnet's adsorption effect on the cylindrical roller may be avoided. Moreover, the timing of generating the magnetic force and the magnitude of the magnetic force may be controlled as needed. In the process of the cylindrical rollers clamping the test tube body, the magnetic force may be avoided from generating through de-energizing, which prevents the clamping effect of the cylindrical rollers on the test tube body from weakening due to the influence of the magnetic force.

In some embodiments, a first pressure sensor is disposed between the cylindrical rollers 10 and the test tube body 4. The first pressure sensor may be used to detect a pressure between the cylindrical rollers 10 and the test tube body 4. In some embodiments, the first pressure sensor may be communicatively connected to the processor and may transmit collected first pressure data to the processor.

In some embodiments, based on the first pressure data, the processor may control whether the power module energizes the coil and the magnitude of current that the power module energizes to the coil.

For example, in a period when the test tube body 4 gradually encounters the cylindrical rollers 10, the cylindrical rollers 10 may gradually undergo extrusion deformation, and the first pressure sensor detects a gradual increase in the first pressure data. At this time, the current that the power module energizes the coil may be controlled to gradually decrease, so that the magnetism of the electromagnet may gradually decrease. When a pressure value reaches a maximum value, the power module may stop energizing, the electromagnet loses its magnetism, and the cylindrical rollers 10 are driven by extrusion friction.

As another example, in a period when the test tube body 4 is gradually detached from the cylindrical rollers 10, the cylindrical rollers 10 gradually return to their original shapes. The first pressure sensor detects a gradual decrease in the first pressure data. At this time, the current that the power module energizes the coil may be controlled to gradually increase, so that the magnetism of the electromagnet may gradually increase, and the electromagnet may attract the cylindrical rollers 10 to return to the central positions of the gradient cavities 13.

In some embodiments, the test tube pad 5 is provided with a second pressure sensor. The second pressure sensor may be communicatively connected to the processor. The second pressure sensor is used to detect a pressure of the test tube body 4 on the test tube pad 5. The second pressure sensor may transmit detected second pressure data to the processor. In some embodiments, the processor may determine an inclined angle of the test tube body 4 based on the second pressure data detected by the second pressure sensor. When the inclined angle reaches a set threshold, the grasping unit 1 no longer presses down the test tube body 4 to avoid crushing it. In this way, the degree of automation of the test tube tightening device may be increased.

In some embodiments, a plurality of third pressure sensors may be disposed on the test tube pad 5. The plurality of third pressure sensors may be evenly distributed in an array. In some embodiments, the plurality of third pressure sensors detect a plurality of pieces of third pressure data, and the processor may obtain a pressure distribution characteristic based on the plurality of pieces of third pressure data.

The pressure distribution characteristic refers to data related to a pressure and a pressure distribution detected by the plurality of third pressure sensors. In some embodiments, the pressure distribution characteristic may include size, density, etc. of the third pressure data. In some embodiments, the pressure distribution characteristic may be represented by a thermodynamic chart.

In some embodiments, the processor may transmit the third pressure data detected by the plurality of third pressure sensors to the remote server, and the remote server may process the third pressure data to generate the pressure distribution characteristic. In some embodiments, by measuring the pressure distribution characteristics of the test tube body 4 with different diameters at different inclined angles, the remote server may establish a pressure-diameter-angle relationship database and store it in the processor. When it is necessary to find a diameter and an inclined angle of a certain test tube body 4, the processor may search for the corresponding pressure distribution characteristic by querying the database and obtain the diameter and the inclined angle of the test tube body 4 corresponding to that characteristic from the database.

In some embodiments, the diameter and the inclined angle of a certain test tube body 4 may correspond to one or more similar pressure distribution characteristics. In some embodiments, a certain pressure distribution characteristic may correspond to the test tube body 4 diameter and the inclined angle in a range. In some embodiments, the pressure distribution characteristic may also include a counter-pressure between the test tube body 4 and the cylindrical rollers 10. In some embodiments, since there are a plurality of cylindrical rollers 10, the counter-pressure distribution characteristic may include a plurality of counter-pressures and their combinations.

In some embodiments, the processor may control the driving device to rotate the rotating shaft 6 in response to the inclined angle of the test tube body 4 being greater than or equal to an inclination threshold. In some embodiments, the inclination threshold may be related to the diameter of the test tube body 4. For example, the smaller the diameter of the test tube body 4, the larger the inclination threshold. The inclination threshold may be preset.

In some embodiments, at least one diameter measuring structure may be disposed in the test tube chamber 7, and the diameter measuring structure may be communicatively connected to the processor. The diameter of the test tube body 4 entering the test tube chamber 7 may be obtained using the diameter measuring structure. In some embodiments, the diameter measuring structure may include at least one of a photoelectric sensor, a laser range finder, an image recognition device, etc.

In some embodiments, the processor may control the inclined angle of the grasping unit 1 grasping the test tube cap 3 based on the test tube diameter obtained from the diameter measuring structure, the length of the test tube body 4, and the inclined angle of the test tube body 4, thereby ensuring that the test tube cap 3 is coaxial with the test tube body 4. In some embodiments, the processor may control the grasping unit 1 to drive the test tube cap 3 to cover the test tube cap 3 on the test tube body 4 at the inclined angle of the test tube body 4. In some embodiments, the processor may control the driving device to drive the test tube body 4 to rotate, so that the test tube cap 3 and the test tube body 4 are screwed tightly with each other. In some embodiments, the processor may determine that the cap is successfully closed in response to the current of the driving device increasing to the preset cap closing current value. More descriptions regarding the preset cap closing current value may be found above.

In some embodiments, at least one fourth pressure sensor and at least one torque sensor may be disposed on a contact surface between the grasping unit 1 and the test tube cap 3. The fourth pressure sensor is used to detect a pressure of the contact surface between the test tube cap 3 and the grasping unit 1. The torque sensor is used to detect torque of the contact surface between the test tube cap 3 and the grasping unit 1. In some embodiments, the fourth pressure sensor and the torque sensor may be connected to the processor.

In some embodiments, the processor may determine whether the test tube cap 3 is coaxial with the test tube body 4 based on torque change data of the contact surface between the grasping unit 1 and the test tube cap 3 and fourth pressure change data.

The torque change data refers to data related to torque between the grasping unit 1 and the test tube cap 3. In some embodiments, the torque change data may include torque between the grasping unit 1 and the test tube cap 3 detected at a plurality of time points, a difference between torque detected at two adjacent time points, a change trend of torque, etc. The torque change data may be obtained through the torque sensor.

The fourth pressure change data refers to data related to a pressure between the grasping unit 1 and the test tube cap 3. In some embodiments, the fourth pressure change data may include the pressures between the grasping unit 1 and the test tube cap 3 detected at a plurality of time points, a difference between the pressures detected at two adjacent time points, a change trend of pressure, etc. The fourth pressure change data may be obtained through the fourth pressure sensor.

In some embodiments, the processor may determine whether the test tube cap 3 is coaxial with the test tube body 4 based on the torque change data. For example, in the process in which the grasping unit 1 drives the test tube cap 3 to come into contact with the test tube body 4, the torque change data between the grasping unit 1 and the test tube cap 3 changes in a trend of initially small, gradually increasing, reaching a maximum value, and finally entering a saturation stage, and the change process is relatively stable. In this case, the processor may determine that the test tube cap 3 is coaxial with the test tube body 4. If the torque change data is relatively large or unstable, it may be considered that the test tube cap 3 is not coaxial with the test tube body 4.

In some embodiments, the processor may determine whether the test tube cap 3 is coaxial with the test tube body 4 based on the pressure change data. For example, the processor may compare the pressure change data between the grasping unit 1 and the test tube cap 3 to assess whether it is uniform. For example, if the processor compares pressure a plurality of pieces of pressure change data of the third pressure sensor and the plurality of pieces of pressure are relatively uniform, it may be considered that the test tube cap 3 is coaxial with the test tube body 4. Otherwise, it is considered that the test tube cap 3 is not coaxial with the test tube body 4.

In some embodiments, the processor may comprehensively determine whether the test tube cap 3 is coaxial with the test tube body 4 based on the torque change data and the pressure change data. For example, if at least one of the torque change data and the pressure change data meets the condition for determining whether the test tube cap 3 is coaxial with the test tube body 4, it is considered that the test tube cap 3 is not coaxial with the test tube body 4.

In embodiments of the present disclosure, the torque change data and the pressure change data are obtained by disposing the sensors, which further effectively determines whether the test tube cap is coaxial with the test tube body, thereby facilitating the automatic cap closing of the screw capping device for a test tube.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

In addition, those skilled in the art will understand that various aspects of the present disclosure may be illustrated and described in several patentable categories or situations, including any new and useful process, machine, product, or combination of substances, or any new and useful improvements thereto. Accordingly, all aspects of the present disclosure may be performed entirely by hardware, may be performed entirely by software (including firmware, resident software, microcode, etc.), or may be performed by a combination of hardware and software. The above hardware or software can be referred to as "data block," "module," "engine," "unit," "component," or "system." In addition, aspects of the present disclosure may be presented as a computer product located in one or more computer-readable mediums, the product including computer-readable program code.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A screw capping device for a test tube, comprising:
a grasping unit configured to grasp a test tube cap; and
a rotating unit directly facing the grasping unit, wherein the rotating unit includes:
a clamping assembly, including a test tube chamber used to accommodate a test tube body, a test tube pad being disposed at a bottom of the test tube chamber, and the test tube pad being provided with an inclined plane towards one side of the test tube body; and
a rotating assembly, including a rotating shaft, the rotating shaft being configured to drive the test tube chamber to rotate, wherein
the clamping assembly further includes a cage, the cage is provided with a plurality of cylindrical rollers, the test tube body is coaxial with the test tube chamber when there is a gap between the test tube body and the test tube pad, and at this time, there is a gap between the test tube body and the plurality of cylindrical rollers;
a plurality of gradient cavities are formed between the cage and the test tube chamber, the plurality of cylindrical rollers are located in the plurality of gradient cavities in a one-to-one correspondence, and the plurality of cylindrical rollers abut against and are pressed against the test tube body from a state where there is a gap between the test tube body and the plurality of cylindrical rollers when moving in the plurality of gradient cavities;
the cage is connected to the rotating shaft, and the rotating shaft is capable of driving the cage to rotate; and
the test tube chamber is mounted with two or more magnets, and the two or more magnets are mounted at a plurality of central positions of the plurality of gradient cavities and are configured to generate magnetic forces to attract the plurality of cylindrical rollers.

2. The screw capping device for a test tube according to claim 1, wherein each of the plurality of gradient cavities is a curved cavity.

3. The screw capping device for a test tube according to claim 2, wherein the plurality of cylindrical rollers and the plurality of gradient cavities are evenly arranged around an axis of the cage.

4. The screw capping device for a test tube according to claim 1, wherein when there are a plurality of magnets, the plurality of the magnets, the plurality of the gradient cavities, and the plurality of the cylindrical rollers are mounted in a one-to-one correspondence.

5. The screw capping device for a test tube according to claim 1, wherein the rotating assembly further includes a base, the base is mounted with a bearing, the test tube chamber is mounted on the base and abuts against the bearing, and the test tube chamber is rotatable around an axis of the test tube chamber relative to the base.

* * * * *